United States Patent [19]
Reedy et al.

[11] 3,823,862
[45] July 16, 1974

[54] CLAMPING TOOL

[75] Inventors: Wayne R. Reedy, Cazenovia; Edward F. Russ, Baldwinsville, both of N.Y.

[73] Assignee: Carrier Corporation, Syracuse, N.Y.

[22] Filed: Mar. 22, 1973

[21] Appl. No.: 343,773

[52] U.S. Cl. .................. 228/4, 29/200 P, 228/6, 228/44
[51] Int. Cl. ............................................. B23k 1/00
[58] Field of Search ............ 228/4, 6, 44; 29/200 P, 29/455; 269/58; 29/464, 474.3

[56] References Cited
UNITED STATES PATENTS

| | | |
|---|---|---|
| 2,544,749 | 3/1951 | Cowie et al. .......................... 228/44 |
| 3,566,507 | 3/1971 | Jacobsen ........................... 29/200 P |
| 3,761,005 | 9/1973 | Baxter et al. ........................... 228/4 |

*Primary Examiner*—J. Spencer Overholser
*Assistant Examiner*—Robert J. Craig
*Attorney, Agent, or Firm*—J. Raymond Curtin; D. Peter Hochberg

[57] ABSTRACT

A tool for forcing a pair of tubular workpieces coaxially together, comprises a stationary clamp for gripping one workpiece and a second clamp mounted on a movable piston for gripping the other workpiece. The clamps each include a fixed arm, and a rotatable arm extending from a shaft which is rotatable in response to the application of fluid pressure to a vane fixed to the shaft. Movement of the piston towards the first clamp urges workpieces held by the clamps into a telescoping relationship.

11 Claims, 4 Drawing Figures

PATENTED JUL 16 1974 3,823,862

CLAMPING TOOL

BACKGROUND OF THE INVENTION

1. Field of the Invention

The present invention relates to tools for holding workpieces in precise alignment and for urging the workpieces together. More specifically, the invention relates to tools for urging elongated workpieces into a telescoping relationship.

2. Description of the Prior Art

In the construction of various articles of manufacture, it is necessary to join tubular members together in axial alignment. An example of such an article of manufacture is described in U.S. Pat. No. 3,633,266 which issued on Jan. 11, 1972 in the name of Glen A. Taylor. That patent discloses a fluxless soldering method for attaching together a pair of aluminum tubes, one of which has a bell end and the other of which has a spigot end which is dimensioned for insertion into the bell end of the first tube. The end of at least one of the tubes is provided with a solid coating of solder, and the spigot end of the one tube is forced axially into the bell end of the other tube in a telescoping relationship; the solder is heated until it melts; and the solder is thereafter cooled to bond the tubes together. In order to render methods of manufacture of the aforementioned type practical, it is important to utilize a clamping tool which can accurately grip and align the two tubes and then force them together.

A clamping tool for use in a butt-welding process is disclosed in U.S. Pat. No. 2,544,749 which was issued on Mar. 13, 1951 in the name of J. P. Cowie et al. The apparatus includes a rather complex arrangement of a pair of clamps which are actuated by hydraulic pistons, one of the clamps being carried on a movable carriage so that the tube held therein can be moved towards the other tube. The carriage is slidable on a track under the influence of a third hydraulic piston. The complexity of such an apparatus, and its size, render it unsuitable for bonding operations of the type described in the Taylor patent.

SUMMARY OF THE INVENTION

An object of the present invention is to hold a pair of tubular workpieces in axial alignment and to urge them together, to facilitate the employment of a manufacturing process for joining the workpieces together.

A further object of the invention is to provide a tool of the foregoing type which is precise in operation and which is compact in construction.

Another object of the invention is the provision of a tool as described above which is economical to manufacture and use.

Other objects will be apparent from the description to follow and from the appended claims.

The foregoing objects are achieved according to a preferred embodiment of the invention by the provision of a clamping tool having a pair of clamps for holding a pair of tubular workpieces in axial alignment. Each clamp includes a fixed clamp arm adapted to engage one of the tubular workpieces so that the workpieces are axially aligned. Each clamp further includes a movable arm adapted to engage the tubular workpiece so that the clamp arms of each clamp cooperate to hold the tubular workpiece in place. The movable arms are attached to rotatable shafts, the arms being rotatable with the rotation of the shafts. Rotation of each shaft is effected by means of a vane attached to the shaft and located in a fluid chamber. Means are provided for creating a pressure differential across each of the vanes to cause the shaft to which the vanes are attached to rotate. One of the clamps is mounted on a movable piston which is slidable in a piston cylinder under the influence of fluid pressure. By applying fluid pressure against a face of the piston, the clamp and and the tubular workpiece which it is holding, can be urged towards the other clamp to force the tubular workpieces together. Once the manufacturing process on the workpieces has been accomplished, the pressure differential on the vanes is reversed to cause the clamp arms to release the workpieces.

DESCRIPTION OF THE PREFERRED EMBODIMENT

The illustrated preferred embodiment of the invention comprises first and second holding means, each such means including a clamp having a pivotally mounted clamp arm, and pressure actuated means for pivoting the latter clamp arm. One holding means is movable in response to fluid pressure for urging workpieces held by the clamps together. Thus, the clamping tool comprises a pair of clamps, each including a fixed arm and a rotatable arm, for holding a pair of tubular workpieces which are to be fastened together, and a piston for carrying one of the clamps to move the tubular workpiece held thereby towards the tubular workpiece held by the other clamp. The fixed clamp arms are configured to position the two tubular workpieces in axial alignment, and the rotatable clamp arms are fastened to rotatably mounted shafts. Rotation of each shaft is accomplished by the exertion of a pressure differential across a vane which extends from the shaft into a fluid chamber. The fluid chamber for one of the clamps is located in a movable piston which is adapted to slide towards a fixed cylinder in which is located the other fluid chamber. The clamp associated with the piston is thus adapted to move the tubular workpiece held thereby into engagement with the other tubular workpiece so that the two workpieces can be attached together. Once the two workpieces have been held together as desired, a fluid pressure is exerted across the vanes to open the clamp arms to release the tubular product.

Figure 3:
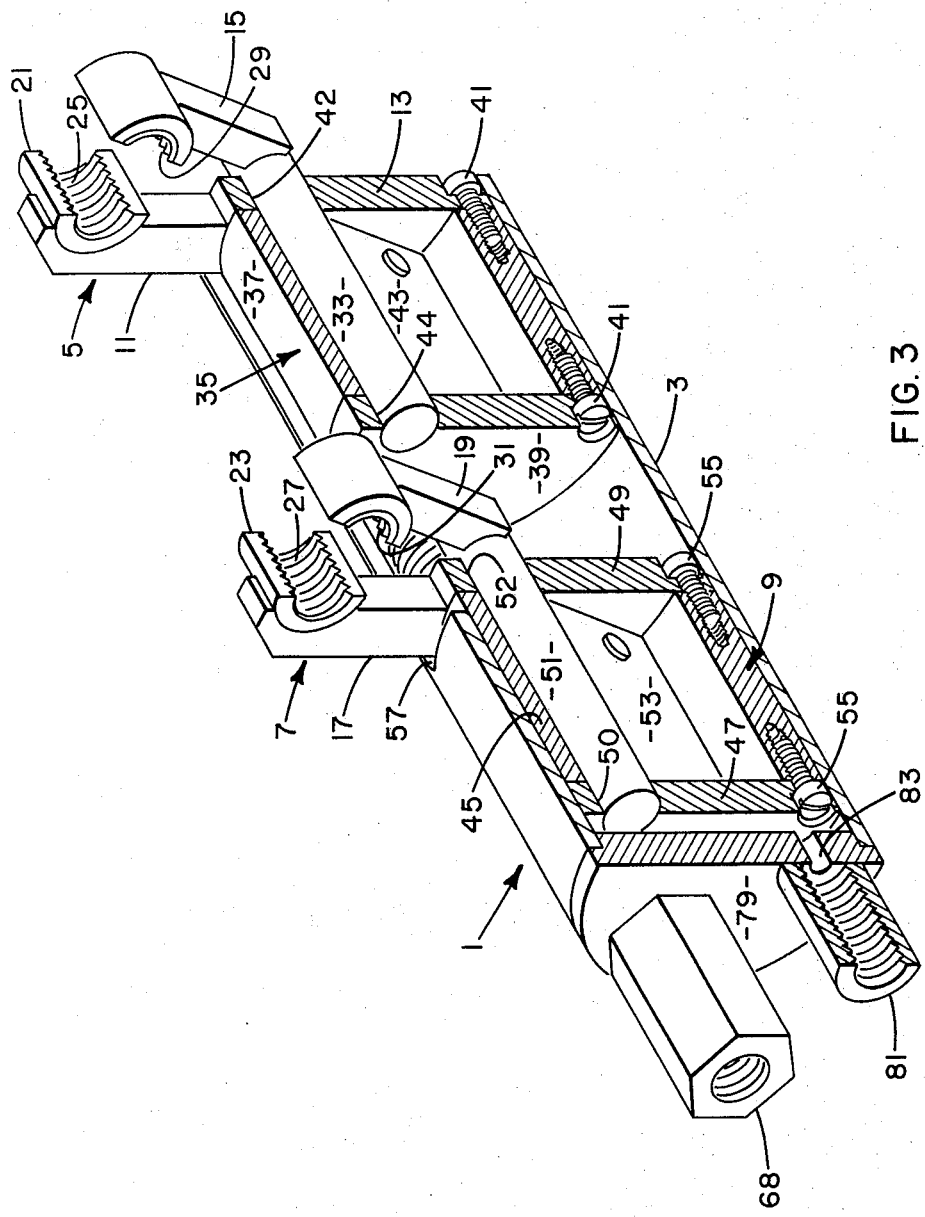
FIG. 3 is a sectional pictorial view of the apparatus shown in FIG. 1 taken in the direction 3—3 indicated by the arrows in FIG. 1.

Referring now to the drawings, a clamping tool 1 is illustrated. The clamping tool comprises a cylindrical housing 3, a clamp 5 which is stationary relative to housing 3, and a second clamp 7 which is mounted on a piston 9 for movement in a path parallel with the axis of housing 3. Stationary clamp 5 includes a fixed arm 11 which is welded or attached by an appropriate fastener to an end wall 13 of housing 3. Clamp 5 further includes a movable arm 15 which is adapted to cooperate with arm 11 to grip a tubular workpiece. Clamp 7 is similar in construction to clamp 5 an includes a fixed arm 17 which is fastened to piston 9, and a rotatable arm 19 which cooperates with arm 17 to grip a second tubular workpiece. Fixed arms 11 and 17 include gripping elements 21 and 23 respectively, the gripping elements having interior cylindrical portions 25 and 27 which are dimensioned to engage tubular workpieces of predetermined outer diameters. Surfaces 25 and 27 are coaxial, so that tubular workpieces engaged by the surfaces are also coaxial. Movable clamp arms 15 and 19 include similar tube engaging surfaces 29 and 31 which are adapted to engage the respective tubular workpieces on opposite sides of the workpieces from portions 25 and 27 respectively, so as to hold the workpieces in precise axial alignment. Surface portions 25, 27, 29 and 31 are provided with coaxial corrugations as shown most clearly in FIG. 3, for enhancing the frictional engagement of tubular workpieces by the clamp arms.

Arm 15 of stationary clamp 5 is attached to a rotatable shaft 33 which is in turn mounted in an air cylinder 35. Air cylinder 35 comprises a cylindrical body 37 to which are attached a circular wall 39 at one end and previously mentioned end wall 13 at the other end. Walls 13 and 39 can be secured to body member 37 by bolts 41 or by other conventional means. Shaft 33 is mounted in holes 42 and 44 in end walls 13 and 39 respectively so that the shaft can rotate in these holes. Rotation of shaft 33 is effected by means of a vane 43 which is attached to shaft 33 and extends therefrom so as to engage the walls defining the air chamber within air cylinder 35. Vane 43 can be attached to shaft 33 by means of a welded joint or by means of an appropriate slot in the shaft for receiving the edge of the vane. As explained below, means are provided for creating an air pressure differential across vane 43 to effect the rotation of the vane and the concomitant rotation of shaft 33 and arm 15. Since a fluid pressure is applied across the vane, it is important that the edges of the vane engage the interior walls sufficiently to provide a seal against the passage of fluid around the vane.

The mounting of clamp 7 is similar to that of clamp 5, with the main difference being that element 9, upon which clamp 7 is mounted, functions both as an air cylinder and as a piston. Piston 9 comprises a cylindrical body member 45 which cooperates with end walls 47 and 49 to define therein an air chamber. A pair of aligned holes 50 and 52 are provided in end walls 47 and 49 to receive a rotatable shaft 51. Clamp arm 19 is attached to shaft 51 and is rotatable therewith. Rotation of shaft 51 is effected by means of a pressure differential applied across a vane 53 which is attached to shaft 51 by means of a weld or is received at its edge portion by an appropriately configured slot in the shaft. The remaining edges of vane 53 engage the walls of the air chamber in a fluid sealing manner. End walls 47 and 49 are attached to cylindrical body member 45 by means of bolts 55. The interior wall of housing 3 is cylindrical, and the exterior wall of piston 9 is also cylindrical and is dimensioned to slide coaxially within housing 3 in sliding engagement with the interior cylindrical surface of housing 3. In order to facilitate the assembly of clamping tool 1, it is advantageous to provide air cylinder 35 with a cylindrical configuration similar to that of piston 9 so that cylinder 35 can be simply slid down housing 3 during the assembly of the apparatus. Since piston 9 must be capable of moving towards cylinder 35, a slot 57 is defined in cylindrical housing 3 to enable clamp 7 to move with the piston.

A pair of hollow parallel tubes 59 and 61 extend into housing 3 and through guides provided in the two air cylinders to receive tubes 59 and 61 in sliding engagement. These guides take the form of tubular guides 62 and 63 in piston 9, and tubular guides 64 and 65 in air cylinder 35. Guides 62–65 can advantageously be integral with the cylindrical body portions of the elements in which the guides are located. Tubes 59 and 61 serve the dual purposes of transmitting pressurized air to the air chambers within piston 9 and air cylinder 35, and of guiding piston 9 in its movement in housing 3. The end portions 66 and 67, respectively, of tubes 59 and 61 are threaded to receive correspondingly threaded receptacles 68 and 69. The latter elements are provided so that air hoses can be attached to the apparatus to transmit air through tubes 59 and 61. Pressurized air is alternatively admitted into one of tubes 59 and 61 to effect the clockwise or counterclockwise rotation of both of shafts 33 and 51. When pressurized air is so admitted through tube 59, it enters the air chamber of piston 9 through a port 71, and enters the air chamber of air cylinder 35 through a slot 73 in guide 64. This air exerts pneumatic pressure on corresponding faces of vanes 53 and 43, causing shafts 51 and 33 to rotate counterclockwise. The foregoing rotation of the shafts in turn causes clamp arms 19 and 15 to close against their respective associated fixed clamp arms. Similarly, when pressurized air is admitted into tube 61, it proceeds through port 75 into the air chamber of piston 9 and through slot 77 in the air chamber of air cylinder 35. This action causes the application of pneumatic pressure on faces of vanes 53 and 43 which results in the clockwise rotation of shafts 51 and 33. The clockwise rotation of the shafts causes rotatable arms 15 and 19 to open. The pressurized air is directed to the selected one of the two tubes 59 or 61 by means of an external valve. Although the illustrated embodiment contemplates the simultaneous rotation of arms 15 and 19, it is within the scope of the invention to rotate these arms independently.

Figures 1, 2, 4:
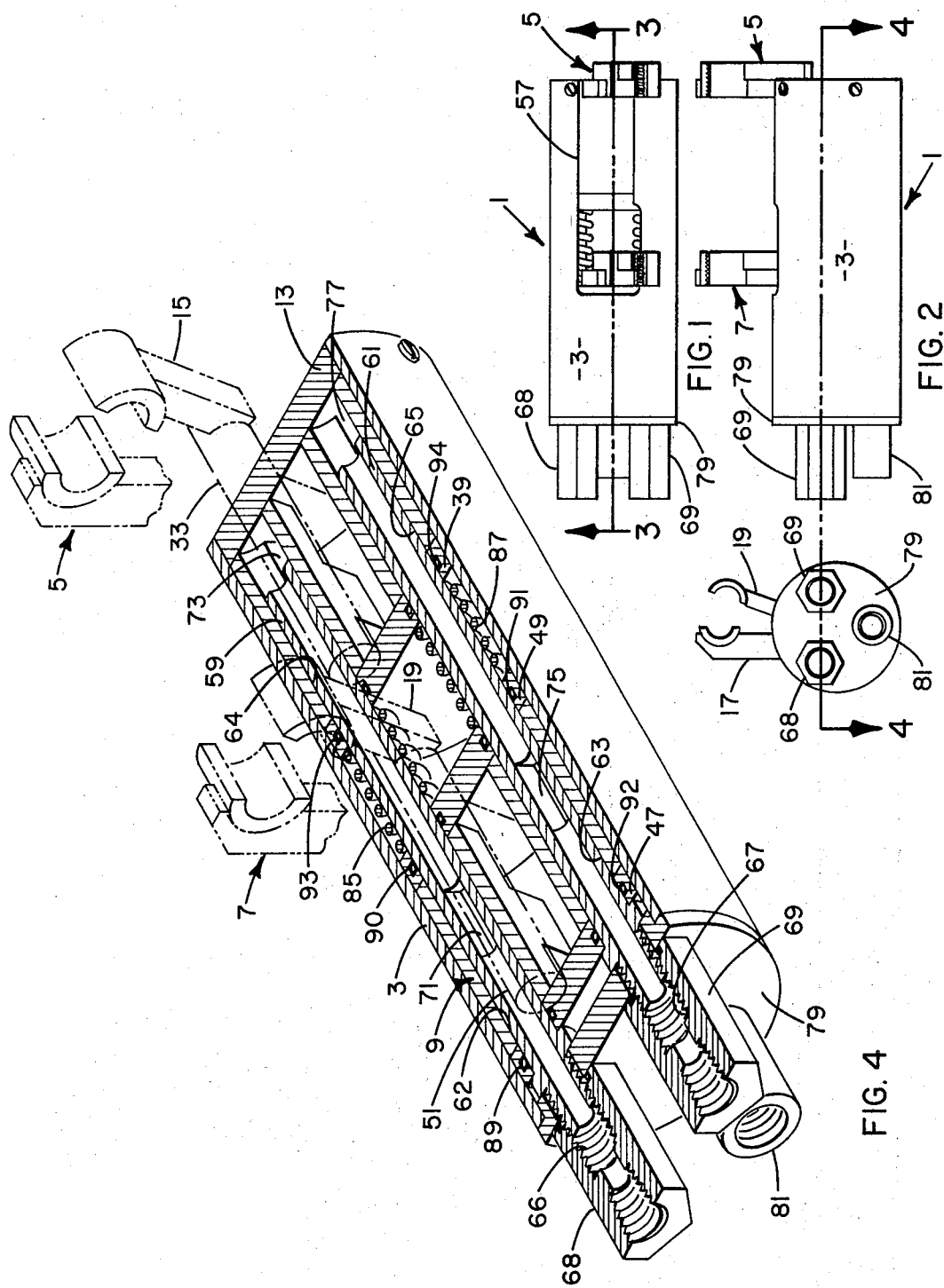
FIG. 1 is a top elevation of a preferred embodiment of the invention.
FIG. 2 depicts side and end views of the apparatus shown in FIG. 1.
FIG. 4 is a sectional pictorial view taken in the direction indicated by arrows 4—4 in FIG. 2.

A third air chamber is defined between end wall 47 of piston 9 and end wall 79 which is attached to housing 3. An air hose receptacle 81 is attached to end wall 79 over an orifice 83 which leads to the air chamber between elements 47 and 79. When pressurized air is admitted through orifice 83, the pneumatic pressure exerted on piston 9 urges the piston (and clamp 7 carried thereby) towards the right as viewed in FIGS. 3 and 4. A pair of coil springs 85 and 87 are wrapped around tubes 59 and 61 in the region between air cylinder 35 and piston 9. These springs urge piston 9 towards end wall 79, so that the air pressure exerted on piston 9 must be sufficient to overcome the force of the springs if the piston is to be moved towards air cylinder 35. Moreover, when the air pressure on piston 9 is reduced below the spring pressure, the springs act to move piston 9 to a position closer to wall 79. Of course, the apparatus could be modified to provide for a pneumatic return of piston 9 to make the use of springs 85 and 87 unnecessary.

In order to reduce the leakage of pressurized air from the air chambers in piston 9 and air cylinder 35, a group of appropriately placed O-rings are provided. Thus, O-rings 89–92 are located in circumferential grooves in end walls 47 and 49 of piston 9 and around the holes through which tubes 59 and 61 extend. Likewise, a pair of O-rings 93 and 94 are provided in circumferential grooves in end wall 39 of air cylinder 35 around the holes through which tubes 59 and 61 extend.

Operation of the illustrated apparatus is straightforward. The operation will be described as used to fasten a tubular workpiece having a bell-shaped end to another tubular workpiece having a spigot end dimensioned for insertion in a telescoping relationship into the bell-shaped end of the first workpiece. It is further contemplated that at least one of the ends of the workpieces to be joined has been presoldered, and that the apparatus is to be used to urge the spigot end of one workpiece into the bell-shaped end of the other workpiece while heat is being applied to the joint to melt the solder. It is further contemplated that the force urging the workpieces together is to be released once the solder has cooled and a permanent bond between the workpieces has been achieved.

At the commencement of the operation, clamping tool 1 is in the condition shown in the drawings. The clamp arms of each of clamps 5 and 7 are open, and piston 9 is at its leftmost position under the influence of springs 85 and 87. There is no pressurized air in either of the air chambers.

A pair of tubular workpieces are placed in gripping elements 21 and 23 with the bell-shaped end of one workpiece facing the spigot end of the other workpiece. By a proper adjustment of the external air valve, pressurized air is admitted through receptacle 68 and tube 59, through port 71 and slot 73 into the air chambers of piston 9 and air cylinder 35. This air exerts a pressure on vanes 43 and 53, and shafts 33 and 51 rotate counterclockwise. The counterclockwise rotation of shafts 33 and 51 causes clamp arms 15 and 19 to rotate with the shafts so that the clamp arms close on the workpieces which have been placed in engagement with gripping elements 21 and 23. The pairs of clamp arms thus grip the two workpieces firmly and hold them in axial alignment. While pressure is maintained on vanes 43 and 53, pressurized air is admitted through receptacle 81 and orifice 83 into housing 3. The pressure of this air is sufficient to overcome the resisting force of springs 85 and 87 to move piston 9 to the right. By means of an appropriately placed stop or by a suitable regulation of the pressure of air admitted behind piston 9, or when the spigot end of one workpiece bottoms against a neck at the base of the bell-shaped end of the other workpiece, the rightward movement of the piston is stopped when the two workpieces have properly telescoped together. At the same time that the workpieces are being urged together, heat is applied to the joint by an external source to melt the solder on the workpieces, whereby the two workpieces can be urged together without undue effort. When the preceding movement of piston 9 has been arrested, the heat source is removed. The workpieces are allowed to sit for a period long enough to assure a proper bond at the joint of the workpieces. When the joint is sufficiently strong, the external air valve is adjusted to cut off the flow of pressurized air into tube 59, and pressurized air is directed through receptacle 69 into tube 61. The air admitted through tube 61 enters the air chambers of piston 9 and air cylinder 35, and exerts a pneumatic pressure on vanes 53 and 43 against the vane faces which are visible in FIG. 3. The application of this pressure causes shafts 33 and 51 to rotate clockwise, which in turn causes clamp arms 15 and 19 to rotate clockwise to their open positions. The opening of the clamps allows the joined workpieces to drop or enables them to be lifted out of the clamping tool.

The embodiment of the invention described above lends itself to various modifications. It was indicated that springs 85 and 87 could be replaced by a pneumatic equivalent. It is also feasible to incorporate springs for urging piston 9 towards air cylinder 35 and to utilize a pneumatic return. Furthermore, it is possible to employ pneumatic pressure to perform one of the opening and closing functions of clamp arms 15 and 19 and to use a spring (connected for example between the movable clamp arm and its associated fixed clamp arm) for effecting the opposite movement of the clamp arms. The clamping tool has been described as used in a soldering operation for attaching especially configured tubular workpiece, but the tool could be modified to urge other types of workpieces together as well. Furthermore, it is within the scope of the invention to employ hydraulic fluids or a combination of hydraulic and pneumatic fluids for applying the various pressures described above.

The invention has been described in detail with particular reference to a preferred embodiment thereof, but it will be understood that variations and modifications can be effected within the spirit and scope of the invention.

We claim:
1. A tool for urging a pair of elongated workpieces coaxially together, said tool comprising:
   A. first holding means for holding one of the workpieces, said first holding means including:
      i. a first clamp arm including engaging means configured to engage the exterior surface of the one workpiece;
      ii. a second clamp arm including engaging means configured to engage the exterior surface of the one workpiece, said second clamp arm being mounted for pivotal movement in an arc towards said first clamp arm to effect the gripping of the one workpiece between said engaging means, and away from said first clamp arm to effect the release of the one workpiece;
      iii. first pressure responsive means for moving said second arm through said arc; and
      iv. means for exerting pressure on said first pressure responsive means;
   B. second holding means for holding the other of the workpieces, said second holding means including:
      i. a third clamp arm including engaging means configured to engage the exterior surface of the other of the workpieces, the engaging means of said first and third clamp arms being positioned to axially align the pair of workpieces when said engaging means engage the exterior surfaces of the workpieces;
      ii. a fourth clamp arm including engaging means configured to engage the exterior surface of the other workpiece, said second clamp arm being mounted for pivotal movement in an arc towards said third clamp arm to effect the gripping of the other workpiece between the engaging means of said third and fourth clamps, and away from said third clamp arm to effect the release of the other workpiece;

iii. second pressure responsive means for moving said fourth arm through said arc; and iv. means for exerting pressure on said second pressure responsive means;

C. means for moving said second holding means towards said first holding means to urge a pair of workpieces gripped by the respective clamping means axially together.

2. A tool according to claim 1 wherein said means for exerting pressure on said first pressure responsive means comprises means for exerting fluid pressure on said first pressure responsive means.

3. A tool according to claim 1 wherein said means for exerting pressure on said second pressure responsive means comprises means for exerting fluid pressure on said second pressure responsive means.

4. A tool according to claim 1 wherein said means for exerting pressure on said first and second pressure responsive means each comprise means for exerting fluid pressure on said pressure responsive means; and said first and second holding means each include surfaces defining a chamber for containing pressurized fluid, and mounting means for mounting said clamp arms for pivotal movement through said arc; and the pressure responsive means included in said holding means each comprise a vane having two fluid contacting sides, said vane being connected to the mounting means included in the respective holding means, said vane being in fluid sealing engagement with the respective chamber defining surfaces and movable across said surfaces; and the fluid pressure exerting means included in each of said first and second holding means includes means for admitting pressurized fluid into the respective chamber on one side of the vane in said chamber to effect movement of the clamp arm in the respective holding means.

5. A tool according to claim 4 wherein each of said fluid pressure exerting means further includes means for admitting pressurized fluid on either side of the vane in the respective chamber to effect movement of the respective second and fourth clamp arms towards or away from the respective first and third clamp arms, for gripping and releasing workpieces from said clamp arms.

6. A tool according to claim 1 wherein said means for moving said second holding means comprises:
a housing for holding said first and second holding means, said housing including an interior surface for engaging the exterior surface of said second holding means to form a fluid seal and an end wall opposite said second holding means, said second holding means being movable along said interior surface towards and away from said first holding means to form with said interior surface and said end wall a variable fluid chamber; and means for admitting pressurized fluid into said variable fluid chamber to urge said second holding means towards said first support means.

7. A tool according to claim 4 and further including means for urging said second holding means away from said first holding means.

8. A tool according to claim 1 wherein said engaging means are grooved to facilitate their gripping of workpieces.

9. A tool according to claim 6 and further including at least one guide rod extending between said holding means, and means defining a receptacle in said second holding means for receiving said guide rod in sliding engagement to guide the movement of said second holding means towards and away from said first holding means.

10. A tool according to claim 9 wherein said means for exerting pressure on said first and second pressure responsive means each comprise means for exerting fluid pressure on said pressure responsive means; and said first and second holding means each include surfaces defining a chamber for containing pressurized fluid; and each of said holding means includes mounting means for mounting said clamp arms for pivotal movement through an arc, and the pressure responsive means included in each of said first and second holding means each comprise a vane connected to the mounting means included in the respective holding means, said vane being in fluid sealing engagement with the respective chamber defining surfaces and movable across said surfaces, and the fluid pressure exerting means included in each of said first and second holding means includes fluid conduit means in said at least one guide rod for admitting pressurized fluid into the respective fluid chambers in said first and second holding means.

11. A tool for urging into a telescoping relationship a pair of tubular workpieces, said tool comprising:
a housing having surfaces defining an interior cylindrical wall;
an end wall sealing one end of said housing;
an air cylinder fixed in said housing and spaced from said end wall, said air cylinder including support means for supporting a rotatable shaft, and surfaces defining an air chamber;
a first clamp arm fixed relative to said housing, said clamp arm including a surface curved to engage a part of the exterior of one of the tubular workpieces;
a first shaft rotatably mounted in said support means in said air cylinder;
a second clamp arm fixed to said first shaft and rotatable therewith, said second clamp arm including a surface configured to engage the one tubular workpiece opposite the part of the workpiece engaged by said first clamp arm in response to the rotation of said first shaft towards the workpiece;
a vane fixed relative to said first shaft, said vane including surfaces for engaging the surfaces defining the air chamber in said air cylinder to form a fluid seal with said chamber defining surfaces, and said vane being movable across said surfaces in response to the exertion of an air pressure differential across said vane, to effect rotation of said first shaft in forward and reverse directions to rotate said second clamp arm towards and away from said first clamp arm;
means for limiting the arc of rotation of said first shaft;
a piston having a cylindrical exterior configuration dimensioned to engage in a fluid sealing manner the interior cylindrical wall of said housing, said piston being disposed in said housing between said end wall and air cylinder and slidable towards and away from said air cylinder to form a variable fluid chamber between said piston and said end wall, said piston including means for supporting a second rotatable shaft, and surfaces defining an air chamber within said piston;

a third clamp arm, said third clamp arm being fixed to said piston and including a surface curved to engage a part of the exterior of the second of the tubular workpieces, the curved surface of said third clamp arm being coaxial with the curved surface of said first clamp arm;

a second shaft, said second shaft being rotatably mounted in the support means in said piston;

a fourth clamp arm fixed to said second shaft and rotatable therewith, said fourth clamp arm including a surface configured to engage the second tubular workpiece opposite the part of the workpiece engaged by said third clamp arm in response to the rotation of said second shaft towards the second workpiece;

a vane fixed relative to said second shaft, said vane including surfaces for engaging the surfaces defining the air chamber in said piston to form a fluid seal with said chamber defining surfaces, said vane being movable across said chamber defining surfaces in response to the exertion of a fluid pressure differential across said vane to effect rotation of said second shaft in forward and reverse directions to rotate said second clamp arm towards and away from said first clamp arm;

means for limiting the arc of rotation of said second shaft;

a set of guide rods extending between said air cylinder and said piston in a direction parallel with the axis of the interior wall of said housing;

means defining a set of interior guide surfaces in said piston for slidably receiving said guide rods, said guide rods and said guide surfaces cooperating to guide said piston towards and away from said air cylinder;

a set of conduits for admitting pressurized air to alternate sides of said vanes to effect movement of said second and fourth clamp arms towards said first and third clamp arms to cause said clamp arms to grip the tubular workpieces, and to effect movement of said second and fourth clamp arms away from said first and third clamp arms to cause said clamp arms to release the tubular workpieces;

a conduit for admitting pressurized air to the variable fluid chamber between said piston and said end wall to move said piston towards said air cylinder, said movement urging the tubular workpieces into a telescoping relationship; and means for urging said piston away from said air cylinder.

* * * * *